United States Patent [19]

Knutson

[11] Patent Number: 5,116,895
[45] Date of Patent: May 26, 1992

[54] POLYMER SYSTEMS AND METHODS FOR THEIR PRODUCTION

[75] Inventor: Gaylen M. Knutson, Yorba Linda, Calif.

[73] Assignee: Union Oil Company of California, Los Angeles, Calif.

[21] Appl. No.: 729,939

[22] Filed: Jul. 15, 1991

Related U.S. Application Data

[62] Division of Ser. No. 292,448, Dec. 30, 1988, Pat. No. 5,055,506.

[51] Int. Cl.$^5$ .............................................. C08K 5/53
[52] U.S. Cl. .................................. 524/123; 524/127; 524/156; 524/157; 524/252; 524/253
[58] Field of Search ............... 524/123, 127, 156, 157, 524/252, 253

[56] References Cited

U.S. PATENT DOCUMENTS

| | | | |
|---|---|---|---|
| 2,607,753 | 8/1952 | Adams | 524/253 |
| 2,616,860 | 11/1952 | Leukhardt, Jr. et al. | 524/253 |
| 2,802,799 | 8/1957 | Johnson | 524/253 |
| 2,903,436 | 9/1959 | Lehman et al. | 524/253 |
| 2,985,609 | 5/1961 | Plitt | 524/253 |
| 3,004,867 | 10/1961 | Collins | 525/232 X |
| 3,048,554 | 8/1962 | Dreisbach | 524/253 |
| 3,102,102 | 8/1963 | Weidner et al. | 524/252 |
| 3,215,647 | 11/1965 | Dunn | 521/69 |
| 3,248,245 | 4/1966 | Hodge et al. | 524/253 |
| 3,321,432 | 5/1967 | Strosser et al. | 524/253 |
| 3,582,508 | 6/1971 | McIntosh | 260/23.7 |
| 3,625,752 | 12/1971 | Korpman | 117/122 P |
| 3,637,564 | 1/1972 | Economy | 524/253 |
| 3,644,257 | 2/1972 | Nickerson et al. | 524/253 |
| 3,740,414 | 6/1973 | Olson | 260/326 A |
| 3,798,194 | 3/1974 | McCann et al. | 524/253 |
| 3,947,396 | 3/1976 | Kangus et al. | 524/253 |
| 4,189,419 | 2/1980 | Takemoto et al. | 260/29.7 NR |
| 4,438,232 | 3/1984 | Lee | 524/272 |
| 4,559,983 | 7/1988 | Knutson et al. | 428/343 |

FOREIGN PATENT DOCUMENTS

| | | | |
|---|---|---|---|
| 160464 | 9/1953 | Australia | 524/253 |
| 558606 | 6/1958 | Canada | 524/253 |

OTHER PUBLICATIONS

Kirk-Othmer Encyclopedia of Chemical Technology vol. 8, pp. 580–602, John Wiley & Sons, NY, N.Y. (1979).

*Primary Examiner*—Joseph L. Schofer
*Assistant Examiner*—J. M. Reddick
*Attorney, Agent, or Firm*—Gregory F. Wirzbicki; Shlomo R. Frieman

[57] ABSTRACT

Polyamines having at least two amine groups are incorporated into a polymer system comprising an anionic surfactant and a polymer having at least one anionic pendant group. The resulting polymer system typically exhibits at least one improved physical property.

20 Claims, 1 Drawing Sheet

POLYMER SYSTEMS AND METHODS FOR THEIR PRODUCTION

This application is a division, of application Ser. No. 07/292,448, filed Dec. 30, 1988 and now U.S. Pat. No. 5,053,506.

BACKGROUND

The present invention relates to polymer systems and, in particular, to emulsion pressure-sensitive adhesives (PSAs), compositions for use in emulsion PSAs, articles containing emulsion PSAs, and methods for making emulsion PSAs.

Certain polymer systems exhibit one or more properties that either need improvement or whose initial values deteriorate over time. For example, the initial corrugated adhesion of some carboxylated styrene/butadiene polymer-tackifying resin emulsion systems not only needs improvement but also decreases over time.

SUMMARY OF THE INVENTION

The present invention provides polymer systems having either one or more improved initial properties or one or more properties that exhibit improved endurance. The polymer systems of the present invention are emulsions comprising (a) a polymer having at least one anionic pendant group and (b) an anionic surfactant, and (c) a polyamine having at least two amine groups. The emulsion is made by combining the anionic surfactant, the polyamine, and the polymer. Drying the emulsion yields a polymer system or mass that can be applied to at least one surface of a substrate.

In one version, the emulsion is a pressure-sensitive adhesive (PSA) emulsion comprising (a) an alkenyl aromatic/alkadiene copolymer having at least one anionic pendant group, (b) a tackifier resin, (c) an anionic surfactant capable of emulsifying the alkenyl aromatic/alkadiene or the tackifier resin or both, and (d) a polyamine having at least two amine groups. Typical PSA emulsions within the scope of the present invention have an improved initial corrugated adhesion and/or a more durable corrugated adhesion.

DRAWINGS

These and other features, aspects and advantages of the present invention will become better understood with reference to the following description, amended claims, and accompanying drawings where:

DETAILED DESCRIPTION OF THE INVENTION

Figure 1:
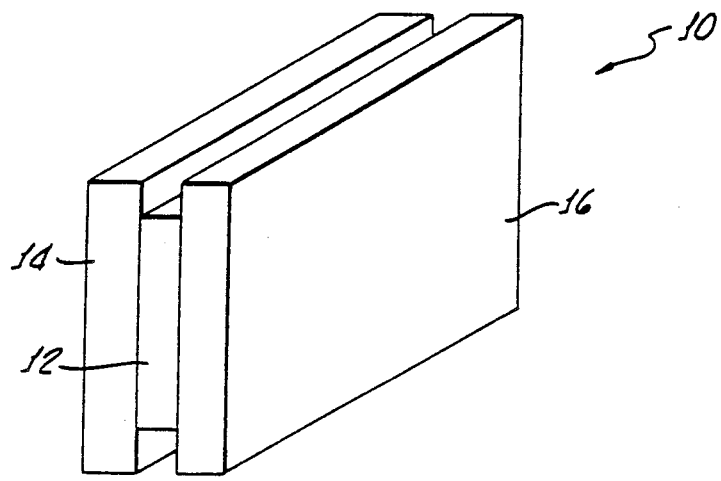
FIG. 1 is an elevation view of an article having a polymer mass embodying features of the present invention sandwiched between a substrate and a release layer.

The present invention is directed to (a) an emulsion comprising (i) a polymer having at least one anionic pendant group, (ii) an anionic surfactant and (iii) a polyamine having at least two amine groups, (b) a polymer system or mass formed by drying the emulsion, (c) a method for making the polymer mass, and (d) articles containing the polymer mass. The polymer mass possesses at least one property that is either initially improved or more stable (i.e., resistant to deterioration) in comparison to the same polymer mass devoid of the polyamine.

The present invention provides an emulsion comprising (a) a polymer having at least one anionic pendant group, (b) an anionic surfactant, and (c) a polyamine having at least two amine groups. Anionic pendant groups include, but are not limited to, carboxyl, sulfate, sulfonate, and mixtures thereof. Typically, the anionic pendant group is incorporated into the polymer as part of a polymerized monomer. For example, monomers containing a carboxyl group or capable of being modified to contain a carboxyl group include, but are not limited to, acid monomers, monomers capable of being hydrolyzed to form acid monomers, and mixtures thereof. Exemplary acid monomers are itaconic acid, methacrylic acid, maleic acid, fumaric acid, and mixtures thereof. Anhydride monomers and acid halide monomers as well as mixtures thereof can be hydrolyzed to form acid monomers. Exemplary anhydride monomers include acrylic anhydride, itaconic anhydride, methacrylic anhydride, and maleic anhydride. Acryloyl halide, itaconoyl halide, methacryloyl halide, maleoyl halide, and fumaroyl halide are typical acid halide monomers. Due to its commercial availability, the chloride form of the acid halide monomers is preferred.

The anionic pendant group can also be incorporated into the polymer by way of a copolymerizable surfactant. Exemplary copolymerizable surfactants include, but are not limited to, sulfoethyl methacrylate, vinyl sulfonate salts, sulfopropylmethacrylate, styrene sulfonate salts, allyl ether salts, 2-acrylamido-2-methylpropanesulfonic acid and salts thereof, as well as mixtures thereof.

Although the polymer must contain anionic pendant groups, it may further comprise one or more additional monomers devoid of even one anionic pendant group. Exemplary non-anionic pendant group-containing monomers include, but are not limited to, alkadiene monomers, alkenyl aromatic monomers, vinyl halide monomers, vinyl alcohol monomers, vinyl acetate monomers, and acrylonitrile monomers. Non-anionic pendant group-containing monomers also include functional nonionic monomers. As used in the specification and claims, the term "functional nonionic monomers" means nonionic monomers that contain at least one group, e.g., hydroxyl, carboxyl, amide, and amine, that can undergo further reaction. Typical functional nonionic monomers include hydroxyalkyl acrylates having the formula I

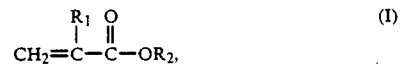

olefinically unsaturated monomers having the formula II

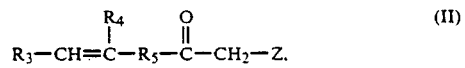

acrylamide monomers having the formula III

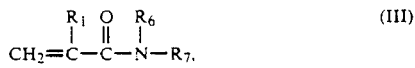

aminoalkyl acrylate monomers having the formula IV

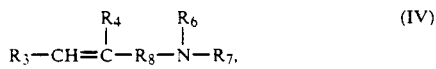

ureido-containing amines, and mixtures thereof. In formula I, supra, $R_1$ is usually selected from the group consisting of hydrogen and alkyl, preferably methyl, and $R_2$ is an hydroxyalkyl group, preferably comprising up to about 6 carbon atoms. Preferred hydroxyalkyl groups comprise up to about 3 carbon atoms. Typical hydroxyalkyl acrylates include, but are not limited to, hydroxyethyl acrylate, hydroxyethyl methacrylate, and mixtures thereof.

In formula II, supra, $R_3$ is usually selected from the group consisting of hydrogen and halogen, $R_4$ is usually selected from the group consisting of hydrogen, halo, thio, and monovalent organic radicals, $R_5$ is a divalent organic or inorganic radical, and Z is usually selected from the group consisting of organoacyl and cyano. Generally, $R_4$ contains up to about 10 atoms other than hydrogen. Preferably, $R_3$ is hydrogen and $R_4$ is hydrogen or an alkyl radical having up to about 10 carbon atoms. $R_5$ can be or contain heteroatoms, such as oxygen, sulfur, phosphorus, and nitrogen. The heteroatoms are preferably selected from the group consisting of oxygen, sulfur, and nitrogen. In addition, $R_5$ can contain functional groups such as carbonyls, carboxy-esters, thio, and amino substituents. Although $R_5$ can also comprise aromatic, olefinic, or alkynyl unsaturated, $R_5$ is preferably saturated. Preferably, $R_5$ is a cyclic or acyclic organic radical containing up to about 40 carbon atoms. Most preferably, $R_5$ is an acyclic organic radical containing up to about 20 atoms in length, with any and all side groups each being up to about 6 atoms in length. Because of commercial availability, Z preferably is organoacyl. Z generally has the formula V

wherein $R_9$ is selected from the group consisting of hydrogen and monovalent organic radicals. Typically, $R_9$ contains up to about 10 atoms in addition to any hydrogen atoms present in the monovalent organic radical. Preferably, $R_9$ is hydrogen or an alkyl group containing up to about 7 carbon atoms. Methyl is the most preferred $R_9$.

A preferred olefinically unsaturated functional nonionic monomer has the formula VI

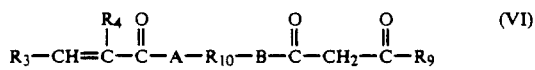

wherein $R_3$, $R_4$, and $R_9$ are as defined above, $R_{10}$ is a divalent organic radical at least 2 atoms in length, and A and B are each independently selected from the group consisting of O, S, and $NR_{11}$, with $R_{11}$ being selected from the group consisting of hydrogen and hydrocarbyl radicals containing up to about 6 carbon atoms. Preferably, $R_{11}$ is hydrogen or an alkyl group. Oxygen is preferred for A and B. Typically, $R_{10}$ contains up to about 40 atoms, but usually contains no more than about 20 atoms. $R_{10}$ can be cyclic or acyclic and contain both cyclic and acyclic moieties. Exemplary cyclic $R_{10}$ groups include cycloalkylenes and phenylene. However, $R_{10}$ is preferably acyclic and is selected from the group consisting of substituted and unsubstituted alkylenes, polyoxyalkylenes, polythioalkylenes, and polyaminoalkylenes. Unsubstituted alkylenes are most preferred for $R_{10}$. Due to its commercial availability, a preferred olefinically unsaturated functional nonionic monomer of formula VI is acetoacetoxyethyl methacrylate having the following formula VII:

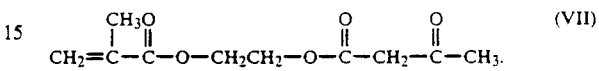

With respect to the acrylamide monomers of formula III, supra, $R_1$ is as discussed above and $R_6$ and $R_7$ are each independently selected from the group consisting of hydrogen and alkyl radicals containing up to about 2 carbon atoms. Preferred acrylamide monomers include acrylamide, methacrylamide, and mixtures thereof.

In the aminoalkyl acrylate monomers of formula IV, supra, $R_3$, $R_4$, $R_6$, and $R_7$ are as discussed above, and R is a divalent alkyl radical, preferably containing 1 to about 5 carbon atoms. An exemplary aminoalkyl acrylate is dimethylaminoethyl methacrylate.

An exemplary ureido-containing amine is 1-[2-(3-allyloxy-2-hydroxypropyl-amino)ethyl]imidazolidin-2-one, commercially known as Sipomer.WAM brand monomer by Alcolac.

With respect to the anionic surfactants, anionic surfactants generally have at least one functionality selected from the group consisting of carboxyl, sulfonate, sulfate, phosphonate, phosphate, and mixtures thereof. Commercially available anionic surfactants include rosin soaps, salts of lauryl sulfate, salts of sulfated nonylphenoxypoly(ethyleneoxy)ethanol, salts of benzene sulfonic acid, salts of sulfonated nonylphenoxypoly(ethyleneoxy)ethanol, salts of dodecyl diphenyloxide disulfonic acid, salts of a free acid of a complex organic phosphate ester, and mixtures thereof.

Surfactant salts have a cation moiety and an anion moiety. Exemplary cation moieties include alkali metals, ammonium, organic ammonium cations, and mixtures thereof. It is preferred that the cation moiety of the salt be capable of substantially completely evaporating from the emulsion. In particular, it is preferred that the cation moiety evaporate from the emulsion within about 20 minutes at 150° F., so that the free acid form of the surfactant is left when the emulsion is dried. The free acid form of the surfactant is then available for neutralization by the much less volatile polyamine. Ammonium and certain organic ammonium cations are capable of meeting this criteria. Exemplary organic ammonium cations capable of meeting this criteria include alkylammonium cations such as trimethylammonium, triethylammonium, diethanolammonium, and mixtures thereof. Because of their low cost and commercial availability, the ammonium salts of the surfactants are generally preferred.

With respect to the polyamine, the polyamine generally contains at least two terminal amine groups. It is also desirable for the polyamine to have at least one amine group between two of the terminal amine groups. In addition, the polyamine typically contains up to about 15 atoms in the longest chain between the terminal amine groups. Preferably, the polyamine contains one to about ten, and more preferably one to about six, atoms in the longest chain between terminal amine groups. In calculating the number of atoms in the chain, only the atoms that form the backbone or bridge connecting the terminal amine groups are counted. Pendant groups and all atoms connected to the backbone are not counted. To illustrate, ethylenediamine, $H_2N-CH_2CH_2-NH_2$, has two atoms in the longest chain between the terminal amine groups. Exemplary polyamines include, but are not limited to, ethylenediamine, diethylenetriamine, triethylenetetramine, tetraethylenepentamine, pentaethylenehexamine, aminoethylpiperazine, piperazine, propylenediamine, 1,3-diaminopropane, iminobispropylamine, dimethylaminopropylamine, menthanediamine, hexamethylenediamine, and mixtures thereof. The preferred polyamines are hexamethylenediamine and, especially, diethylenetriamine.

In the preferred embodiment, the emulsion comprises at least about 1.5 equivalents of amine per equivalent of anionic pendant group on the polymer. More preferably, the emulsion comprises about 1.5 to about 3 equivalents of amine per equivalent of anionic pendant group on the polymer. Most preferably, about 1.8 to 2.2, and most highly preferred of all, two equivalents of amine are present in the emulsion per equivalent of anionic pendant group on the polymer. In an alternative embodiment of the invention, the emulsion comprises a composition in which the ratio of the amine equivalents to the anionic pendant group equivalents on both the polymer and the anionic surfactant is at least about 0.5 to 1. More typically, the ratio of the amine equivalents to anionic pendant group equivalents on both the polymer and the anionic surfactant is about 0.5:1 to about 1.5:1, the preferred ratio being about 1:1.

In one version of the invention, the emulsion is a pressure-sensitive adhesive (PSA) emulsion that further comprises a tackifier resin. Typical tackifier resins include, but are not limited to, rosin, partially decarboxylated rosin, partially dimerized rosin, natural resins, hydrogenated wood rosin, plasticized hydrogenated rosin, aliphatic hydrocarbon resins derived from petroleum, aromatic resins derived from petroleum, terpene resins, coal tar polyindene resins, ethylene vinyl acetate copolymer resins, terpene phenolics, courmarone-indenes, rosin esters, polydicyclobutadiene resins, and mixtures thereof. Exemplary rosin esters are glycerol esters of polymerized rosin and pantaerythritol esters of rosin acids. The preferred tackifier resins are pentaerythritol esters of rosin acids.

In PSA emulsions, the polymer is preferably an alkenyl aromatic/alkadiene copolymer having at least 1 anionic pendant group. Alkenyl aromatic monomers are any organic compound containing at least one aromatic ring and at least one aliphatic-containing moiety having alkenyl unsaturation. Preferred alkenyl aromatic monomers are represented by the formula VIII

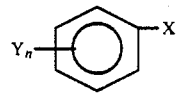

(VIII)

wherein
X is an aliphatic radical containing at least one alkenyl bond, Y is a substituent on the aromatic ring, and n is the number of Y substituents on the ring, n being an integer from 0 to 5. Generally, X comprises at least 2 carbon atoms, but usually no more than about 6, and preferably no more than about 3 carbon atoms. X is preferably a substituted or unsubstituted alkenyl group. Preferred alkenyl group substituents are halogen radicals, e.g., chloride. However, the most preferred alkenyl group is unsubstituted, i.e., a hydrocarbon, and contains only one olefinic unsaturation. Ethylene is the most preferred X.

Y is an organic or inorganic radical. As used throughout the specification and claims, the term "organic radical" means any group containing at least one carbon atom, and the term "inorganic radical" means any group devoid of even one carbon atom. When n is 2 or more, Y can be the same or different. If organic, Y generally contains from 1 to about 15 carbon atoms and, preferably, is an aliphatic radical. Even more preferably, Y is a saturated aliphatic radical. If inorganic, Y is preferably a halogen. Exemplary substituents for Y include halo and cyano radicals and substituted and unsubstituted alkyl radicals of 1 to about 10 carbon atoms. Preferred Y substituents are chloride and unsubstituted alkyl groups of 1 to about 6 carbon atoms. Y is most preferably a chloride radical and $C_1$ to about $C_4$ unsubstituted alkyl radicals.

Illustrative alkenyl aromatic monomers include styrene, p-methyl styrene, methyl styrene, o,p-dimethyl styrene, o,p-diethyl styrene, p-chlorostyrene, isopropyl styrene, t-butyl styrene, o-methyl-p-isopropyl styrene, o,p-dichlorostyrene, and mixtures thereof. Due to its commercial availability and low cost, styrene is the preferred alkenyl aromatic monomer.

An exemplary alkadiene monomer has the formula IX

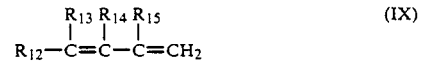

(IX)

wherein $R_{12}$, $R_{13}$, $R_{14}$, and $R_{15}$ are each independently selected from the group consisting of hydrogen, halogen, and alkyl radicals, preferably containing 1 to about 2 carbon atoms. Commercially available alkadiene monomers include butediene, isoprene, 1,3-pentadiene, 2-ethyl butadiene, and 4-methyl-1,3-pentadiene. The preferred alkadiene monomer is butadiene.

In general, the alkenyl aromatic/alkadiene copolymer comprises about 10 to about 70 weight percent alkenyl aromatic monomer and about 30 to about 90 weight percent alkadiene monomer. Preferably, the alkenyl aromatic/alkadiene copolymer comprises about 15 to about 45 weight percent alkenyl aromatic monomer and about 55 to about weight percent alkadiene monomer.

It is also preferred that the alkenyl aromatic/alkadiene copolymer be a carboxylated alkenyl aromatic/alkadiene copolymer, and more preferably a carboxylated styrene/butadiene copolymer. An exemplary carboxylated alkenyl aromatic/alkadiene copolymer contains up to about 5 weight percent carboxyl-containing monomer, and preferably about 0.25 to about 4 weight percent carboxyl-containing monomer. The preferred carboxyl-containing monomer is an acid monomer, namely, itaconic acid.

It is also preferred that the polymer used in a PSA emulsion contain at least one functional nonionic monomer, e.g., acetoacetoxyethyl methacrylate. Typically, the polymer comprises up to about 2 weight percent functional nonionic monomer. Above about 2 weight percent, the functional nonionic monomer tends to contribute no further significant improvement. Therefore, economics dictates 2 weight percent as the practical upper limit because functional monomers generally are more expensive than non-functional monomers. Preferably, the polymer contains about 0.3 to about 0.5 weight percent functional nonionic monomer.

A carboxylated styrene/butadiene copolymer PSA emulsion preferably comprises about 40 to about 85 weight percent on a dry basis of the carboxylated styrene/butadiene copolymer, about 15 to about 60 weight percent on a dry basis of the tackifying resin, a sufficient amount of the anionic surfactant to emulsify the copolymer and the tackifying resin, and a sufficient amount of polyamine so that the emulsion comprises at least about 1.5 equivalents of amine per equivalent of anionic pendant group on the carboxylated styrene/butadiene. Preferably, the emulsion comprises about 60 to about 70 weight percent on a dry basis of the copolymer and about 30 to about 40 weight percent on a dry basis of the resin.

In general, the emulsion is made by combining (1) a polymer emulsion comprising (a) water, (b) a polymer having at least 1 anionic pendant group, and (c) an anionic surfactant, and (2) a polyamine. In the case of PSA emulsions, the emulsions are made by combining (1) the polymer emulsion, (2) the polyamine, and (3) a tackifying resin. Typically, the tackifying resin is present in a tackifying resin emulsion comprising the tackifying resin and an anionic surfactant.

To avoid adversely affecting the tackifying emulsion, it is preferred to raise the pH of the polymer emulsion to at least about 7 prior to combining the polymer emulsion with the tackifying resin emulsion. Preferably, the pH of the polymer emulsion is adjusted with ammonium hydroxide to about 8 to about 9. After raising the pH of the polymer emulsion, the pH modified polymer emulsion is combined with the tackifying resin emulsion and polyamine in any desired order. Preferably, the pH modified polymer emulsion is first combined with the polyamine, with the tackifying resin emulsion being introduced into the resulting composition.

Drying of the emulsion yields a polymer mass. When the emulsion is a carboxylated styrene/butadiene, tackifier comprising PSA emulsion, or more precisely a PSA compound emulsion, the resulting polymer mass typically has an initial corrugated adhesion of at least about 8 hours. Since a high corrugated adhesion is desirable, it is preferred that the carboxylated styrene/butadiene copolymer mass have initial corrugated adhesion of at least about 15 hours, or preferably at least about 80 hours, and even at least about 100 hours. It is also desirable that the carboxylated styrene/butadiene copolymer mass be capable of maintaining its corrugated adhesion over time. Accordingly, it is preferred that the corrugated adhesion of the carboxylated styrene/butadiene copolymer mass after being aged at about 150° F. for about 3 days be at least about 5 hours, more preferably at least about 10 hours, and even at least about 15 hours.

Although the invention is not to be held to any theory of operation, it is believed that the improved results exhibited by the compositions of the present invention are due to the polyamine forming an ionic bridge between the anionic pendant group on the polymer and the anionic moiety of the anionic surfactant when the free acid form of the surfactant is neutralized by the polyamine. The ionic bridge prevents the anionic surfactant and any composition, e.g., the tackifying resin, emulsified in the anionic surfactant from migrating away from the interior of the polymer mass and towards the polymer mass's surface with the consequent deterioration of one or more polymer mass properties.

With respect to the Figures, a PSA polymer mass 12 embodying features of the present invention can be employed in an article 10. In the version of the invention illustrated in FIG. 1, the article 10 comprises a substrate 14 and a release layer 16, with the PSA polymer mass 12 being sandwiched between the substrate 14 and the release layer 16. For example, the polymer mass 12 can be a pressure sensitive adhesive and the release layer 16 can be oriented polyproplene.

Figure 2:
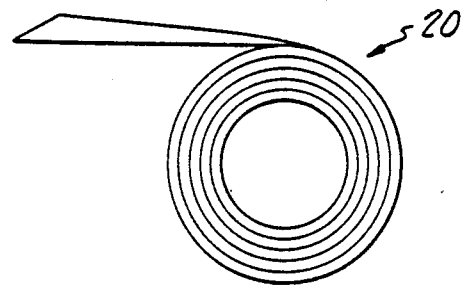
FIG. 2 is an elevation view of an adhesive tape.
Figure 3:
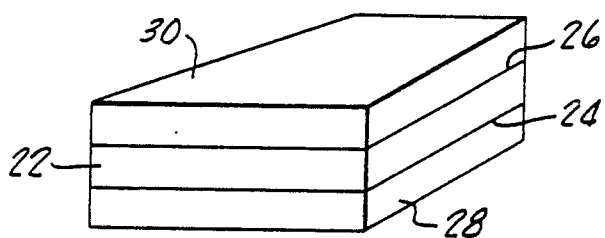
FIG. 3 is a fragmentary, magnified view within area 3 of FIG. 2 showing a substrate having a first and second surface, at least a portion of the first surface being covered by a release coating and a portion of the second surface being covered by a polymer mass embodying features of the present invention.

In another version of the invention as illustrated in FIGS. 2 and 3, an adhesive tape 20 comprises a substrate 22 having a first surface 24 and a second surface 26. At least a portion of the first surface 24 is covered by a PSA polymer mass 28 and at least a portion of the second surface 26 is covered by a release layer or coating 30. The tape 20 exhibits an improved corrugated adhesion due to the use of the above described polymer mass 28.

EXAMPLES

The following examples demonstrate that polymers containing polyamines are capable of exhibiting at least one improved property. However, the invention is not limited to the examples, the invention being defined by the claims.

EXAMPLE 1

Synthesis of Carboxylated SBR Compound Emulsion

A carboxylated styrene/butadiene (SBR) emulsion, containing about 25 parts by weight on a dry basis (pbwdb) styrene, about 75 pbwdb butadiene, about 0.5 pbwdb acetoacetoxyethyl methacrylate, and about 1 pbwdb itaconic acid, was contacted with a sufficient amount of ammonium hydroxide to raise the pH of the emulsion to about 8.2. An emulsified pentaerythritol ester of a rosin acid (obtained from Tenneco-Malrose, Inc.) was added to the pH modified carboxylated SBR emulsion, with stirring, to form a compound emulsion. The compound emulsion contained about 65 pbwdb carboxylated SBR polymer and about 35 pbwdb pentaerythritol ester of a rosin acid.

EXAMPLES 2–4

Synthesis of Carboxylated SBR Compound Emulsions Within Scope of Invention

The carboxylated SBR emulsion used in Example 1 was contacted with a sufficient amount of ammonium hydroxide to raise the pH of the emulsion to about 8.2. A polyamine (30 weight percent solution in water; 1 pbwdb of either ethylene diamine or diamine cyclohexane or diethylene triamine (DETA)) was added, with stirring to the pH modified carboxylated SBR emulsion. An emulsified pentaerythritol ester of a rosin acid (obtained from Tenneco-Malrose, Inc.) was then added to the polyamine containing SBR emulsion, with stirring, to form a compound emulsion. The compound emulsion contained about 65 pbwdb carboxylated SBR polymer, about 35 pbwdb pentaerythritol ester of a rosin acid, and about 1 pbwdb polyamine.

EXAMPLES 5-8

Corrugated Board Adhesion Test

The compound emulsion of Example 1 was applied to a sheet (about 1 mil thick) of Mylar brand polyethylene terephthalate (PET) and dried at about 150° F. for about 20 minutes to yield a polymer mass having a thickness of about 1 mil. All test samples and materials were conditioned for about 16 to about 24 hours and the tests carried out at about 73° F. and about 50% relative humidity. Samples of adhesive coated PET were cut about 1 inch wide by about 2 to about 2 ½ inches long. Masking tape was applied over the polymer mass adhesive on one end of the strip so that the exposed polymer mass adhesive surface area was about 1 inch by about 1½ inches. The sample was then applied to a piece of corrugated board with the 1½ inch edge perpendicular to the 5 inch edge of the corrugated board, or parallel to the flutes, so that the one inch edges of the polymer mass adhesive was about ¼ inch away from the edges of the corrugated board. Care was taken to avoid depositing finger oils on the corrugated surface. The sample was then rolled down with a 4½ lb. rubber covered roller one time parallel to the 1½ inch edge of the PET at 12 inches per minute. The sample was then mounted in a Shear Test block which had been set at 20° angle from vertical so that the masking tape "tail" of the adhesive tape strip was hanging down from the bottom portion of the tape strip bonded to the corrugated board. A 500 g weight was immediately ($\leq$60 seconds dwell) attached to the "tail" of the adhesive strip so that the weight hung at a 160° angle from the part of the tape strip bonded to the corrugated board. The load was applied gently and without swinging so that no more than the specified load acted on the sample. The timer unit was turned on immediately after applying the weight to the sample. The average time, in minutes, of failure of duplicate samples is reported in the Table I below.

After completing the above test, a similarly prepared sample was then aged at about 150° F. for up to about 3 days. The aged sample was then retested according to the above procedure. The results are also set forth in the following Table I.

TABLE I

| | Corrugated Adhesion, minutes | | |
|---|---|---|---|
| | | Film Aged at 150° F., Days | |
| Polyamine | Fresh Film | 1 | 3 |
| None | 265 | 183 | 43 |
| Ethylene Diamine | 796 | 7 | 2 |
| Diamine Cyclohexane | 737 | 1241 | 15 |
| DETA | 649 | 4481 | >7700 |

Each of the polyamine containing compound emulsions of Examples 2-4 was also tested via the above procedures and the results of these tests are also set forth in the above Table I.

Table I indicates that exemplary polyamine containing polymer masses exhibit an improved initial corrugated adhesion and, in some cases, also a more durable corrugated adhesion.

EXAMPLE 9

Synthesis of Carboxylated SBR Compound Emulsion

A carboxylated SBR emulsion, containing about 25 pbwdb styrene, about 75 pbwdb butadiene, about 0.5 pbwdb N-vinylcaprolactam, and about 1 pbwdb itaconic acid, was contacted with sufficient amount of ammonium hydroxide to raise the pH of the emulsion to about 8.2. An emulsified pentaerythritol ester of a rosin acid (obtained from Tenneco-Malrose, Inc.) was added to the pH modified carboxylated SBR emulsion, with stirring, to form a compound emulsion. The compound emulsion contained about 65 pbwdb carboxylated SBR polymer and about 35 pbwdb pentaerythritol ester of a rosin acid.

EXAMPLE 10

Synthesis of Carboxylated SBR Compound Emulsions Within Scope of Invention

The carboxylated SBR emulsion used in Example 9 was contacted with a sufficient amount of ammonium hydroxide to raise the pH of the emulsion to about 8.2. A sufficient amount of DETA to provide about two equivalents of amine per equivalent of anionic functionality on the SBR polymer was added as a 30 weight percent solution in water, with stirring, to the pH modified carboxylated SBR emulsion. An emulsified pentaerythritol ester of a rosin acid (obtained from Tenneco-Malrose, Inc.) was then added to the polyamine containing SBR emulsion, with stirring, to form a compound emulsion. The compound emulsion containing about 65 pbwdb carboxylated SBR polymer, about 35 pbwdb pentaerythritol ester of a rosin acid, and about 1 pbwdb DETA.

EXAMPLE 11-12

Corrugated Board Adhesion Test

The Corrugated Board Adhesion Test described in Examples 5-8 was repeated using the compound emulsions of Examples 9 and 10. The results are set forth in the following Table II. In addition, the Corrugated Adhesion Test of Examples 5-8 was also modified using oriented polypropylene, as a release liner. In particular, after drying the compound emulsion on the PET to form a polymer mass of about 1 mil, the polymer mass was cooled for about 10 minutes and then a release liner was placed across the cooled, dry polymer mass before conditioning the sample at about 73° F. All the remaining steps of the test were the same with the following modifications. The release liner (a) removed from the sample before attaching the masking tape, (b) replaced on the polymer mass before aging the sample at about 150° F., and (c) again removed from the sample before attaching the masking tape to the aged polymer mass. The results of the above modified Corrugated Board Adhesive Test are also set forth in Table II.

TABLE II

| | | Corrugated Adhesion, minutes | | |
|---|---|---|---|---|
| | Release | | Film Aged at 150° F., days | |
| Polyamine | Liner | Fresh Film | 1 | 3 |
| None | None | 204 | 1304 | 982 |
| None | Oriented Polypropylene | <92 | <107 | <52 |
| DETA | None | 304 | >1200 | NA[1] |
| DETA | Oriented | 471 | 629 | 379 |

TABLE II-continued

| | | Corrugated Adhesion, minutes | | |
|---|---|---|---|---|
| | | | Film Aged at 150° F., days | |
| Polyamine | Release Liner | Fresh Film | 1 | 3 |
| | Polypropylene | | | |

[1]NA denotes not available.

Table II also indicates that an exemplary polyamine-containing polymer mass exhibits a corrugated adhesion having an initially improved value. In addition, the corrugated adhesion of the exemplary polyamine-containing polymer mass is more endurable after being contacted with a release liner than a similar polymer mass devoid of the polyamine.

Although the present invention has been described in considerable detail with reference to certain preferred versions, other versions are possible. For example, the compound emulsion can optionally contain plasticizers. Therefore, the spirit and scope of the appended claims should not necessarily be limited to the description of the preferred versions contained herein.

What is claimed is:

1. A polymer mass formed by drying an emulsion comprising:
   (a) an alkenyl aromatic/alkadiene copolymer having at least one anionic pendant group;
   (b) a tackifier resin;
   (c) an anionic surfactant capable of emulsifying the alkenyl aromatic/alkadiene or the tackifier or both; and
   (d) a polyamine having at least two amine groups, wherein the polymer mass is a pressure-sensitive adhesive.

2. A polymer mass formed by drying an emulsion comprising:
   (a) about 40 to about 85 weight percent on a dry basis of a carboxylated styrene/butadiene copolymer;
   (b) about 15 to about 60 weight percent on a dry basis of a tackifying resin;
   (c) a sufficient amount of an anionic surfactant to emulsify the copolymer and the tackifying resin; and
   (d) a sufficient amount of a polyamine for the emulsion to comprise at least about 1.5 equivalents of amine per equivalent of anionic pendant group on the copolymer,
wherein the polymer mass is a pressure-sensitive adhesive.

3. The polymer mass of claim 2 having an initial corrugated hold of at least about 8 hours.

4. The polymer mass of claim 2 having a corrugated hold of at least about 5 hours after being aged at about 150° F. for about 3 days.

5. A method for forming a polymer mass, the method comprising the steps of:
   (a) combining a polymer emulsion comprising water and an alkenyl aromatic/alkadiene copolymer having at least one anionic pendant group, (ii) an anionic surfactant capable of emulsifying the alkenyl aromatic/alkadiene or a tackifying resin or both, and (iii) a polyamine having at least two amine groups to form a compound emulsion; and
   (b) drying the compound emulsion to form the polymer mass, the polymer mass being a pressure-sensitive adhesive.

6. The method of claim 5 wherein the anionic surfactant is a component of the polymer emulsion.

7. The method of claim 5 wherein the tackifying resin is also combined with the polymer emulsion, the surfactant, and the polyamine to form the compound emulsion.

8. The method of claim 5 wherein a tackifying resin emulsion comprising the tackifying resin is also combined with the polymer emulsion, and the polyamine to form the compound emulsion.

9. The method of claim 8 wherein the anionic surfactant is part of the tackifying resin emulsion.

10. The method of claim 5 further comprising the step of neutralizing the polymer emulsion so that the polymer emulsion has a pH of at least about 7 prior to combining the polymer emulsion with the polyamine.

11. The polymer mass of claim 1 wherein the anionic pendant group is selected from the group consisting of carboxyl, sulfate, sulfonate, and mixtures thereof.

12. The polymer mass of claim 10 wherein the anionic pendant group is part of a polymerized monomer, the monomer being selected from the group consisting of acid monomers, monomers capable of being hydrolyzed to form acid monomers, and mixtures thereof.

13. The polymer mass of claim 1 wherein the anionic surfactant has at least one functionality selected form the group consisting of carboxyl, sulfonate, sulfate, phosphonate, phosphate, and mixtures thereof.

14. The polymer mass of claim 1 wherein the polyamine comprises at least two terminal amine groups and contains up to about 15 carbon atoms in the longest chain between the terminal amine groups.

15. The polymer mass of claim 1 wherein the emulsion comprises at least about 1.5 equivalents of amine per equivalent of anionic pendant group in the polymer.

16. The polymer mass of claim 1 wherein the emulsion comprises at least about 1.5 to about 3 equivalents of amine per equivalent of anionic pendant group in the polymer.

17. The polymer mass of claim 1 wherein the ratio of the amine equivalents to anionic pendant group equivalents in both the polymer and the anionic surfactant is at least about 0.5 to about 1.

18. The polymer mass of claim 1 wherein said copolymers further comprises at least one functional nonionic monomer.

19. The polymer mass of claim 1 wherein the emulsion prior to the addition of the tackifier resin has a pH of at least about 7.

20. The polymer mass of claim 1 wherein the emulsion has a pH of at least about 8.

* * * * *